Oct. 17, 1961   R. C. SABINS   3,004,905
CATHODIC PROTECTION
Filed Feb. 9, 1959
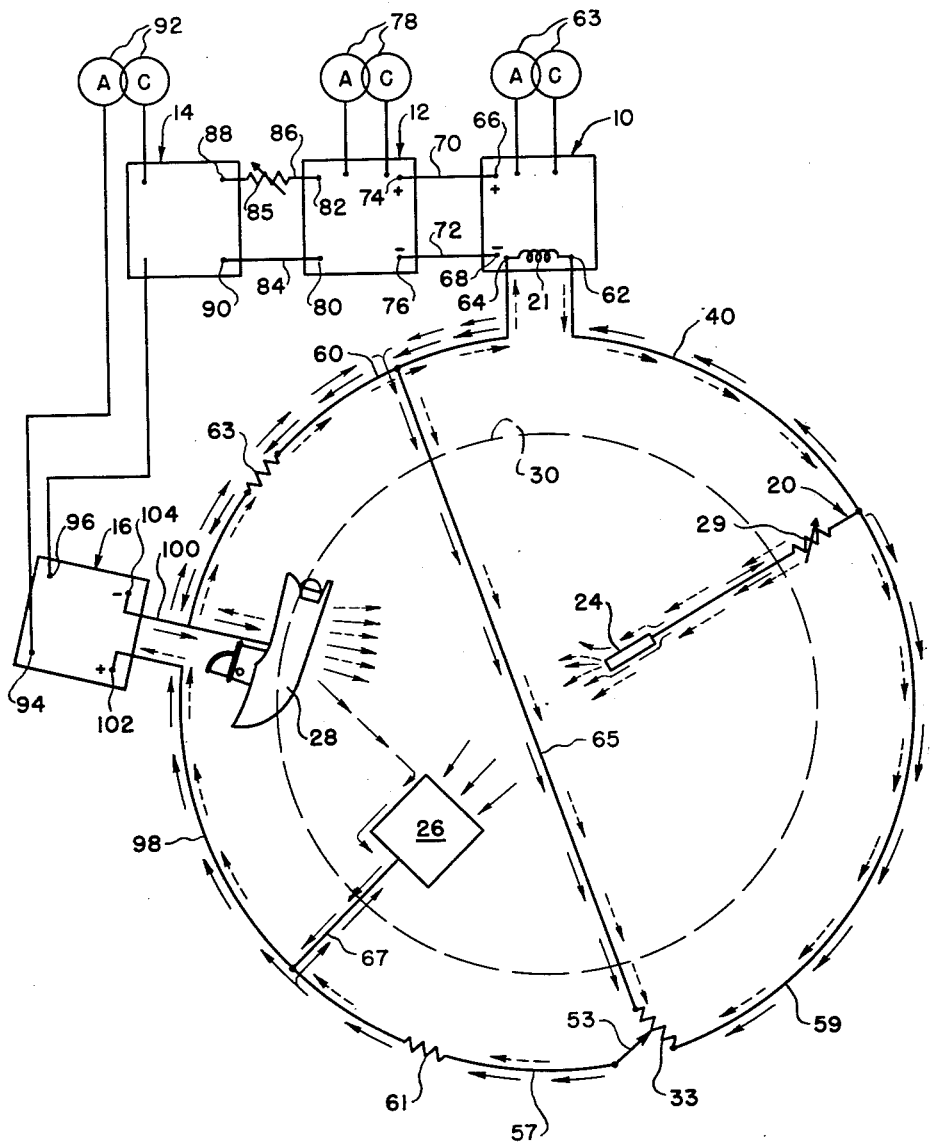
INVENTOR.
ROLLAND C. SABINS
BY Fulwider, Mattingly
& Huntley
ATTORNEYS

United States Patent Office 3,004,905
Patented Oct. 17, 1961

3,004,905
CATHODIC PROTECTION SYSTEM
Rolland C. Sabins, 522 Catalina Ave., San Diego, Calif.
Filed Feb. 9, 1959, Ser. No. 791,947
31 Claims. (Cl. 204—147)

The present invention relates generally to a control system and method and more particularly to a control system and method for automatically providing cathodic protection for various types of structures, such as vessels or the like which normally float or are immersed in water or to other structures which are subjected to some solution which acts as an electrolyte.

As is well known, such systems include an extraneous source of D.C. current impressed upon the cathodic structure to elevate the potential thereof to above the dissolution potential. The current requirement to provide satisfactory protection is dependent upon many factors, as for example, as to floating vessels, the speed of movement the hull through the water, the temperature of the water, the ionic contents of the water through which the hull is moving, etc. Such structures, such as the hull of a ship, are often subjected to shock and vibrations, such as would be produced by gunfire aboard navy ships. The difficulty of control is also increased by the fact that the system must operate over long periods of time, must operate over a wide range of impressed current; it must respond to very small control currents, and must provide magnification of a very high order.

Each of the systems of the foregoing type includes the cathodic structure to be protected, an anode or anode array, both of which are subjected to an electrolyte and connected with one another by an external source of D.C. current for impressing a current on the cathodic structure. Such systems may take various forms, and for the purpose of illustrating one form of the system, I have chosen a ship or ship's hull as the cathodic structure, and the water in which it floats or is immersed as the electrolyte. The ship or ship's hull will be referred to herein as the "cathode" and the anode or anode array, hereinbefore mentioned, as the "ship's anode." At times herein, the ship's hull, the anode array and the electrolyte will be referred to as the "ship cell."

The present invention contemplates a monitoring system for controlling the value of D.C. current impressed upon a cathode. This monitoring system includes a closed circuit which connects a "reference" or "drive" anode, also immersed in the electrolyte (water), with the cathode; this reference or drive anode is formed of material which may have a lower or higher potential level than the increased desired potential level of the protected cathode; the monitoring circuit also includes a solid state conductor which connects the reference anode with the positive side of the source of D.C. current. Thus a complete loop is formed of solid state material, as will be more clearly set forth hereinafter.

The monitoring system of the present invention includes a "reference circuit," the term "reference circuit" being employed to distinguish that circuit from other controlling circuits of the monitoring system; this reference circuit includes the electrolyte, a conductor connecting the reference anode and the ship or cathode, and this conductor includes a current responsive device and relatively high resistances. One of these resistances is disposed between the ship and the current responsive device and the other is a variable resistance interposed between the current responsive device and the reference anode. The monitoring system also includes a "vitalizing circuit" or "maintaining circuit"; this latter circuit includes a conductor, one end of which is connected to the reference circuit intermediate the first mentioned resistance of the reference circuit and the current responsive device; the other end of the conductor is connected through a variable resistance and a fixed resistance to the positive side of the impressed D.C. current and to the ship's anode array and thereby to the electrolyte; being connected to the reference circuit, it is therefore connected with the ship's hull and with the reference anode, the connection with the reference anode being through the current responsive device. The monitoring system also includes a "governing drain circuit"; this latter circuit includes a conductor, one end of which is connected with the reference circuit intermediate the control device and the variable resistance in said reference circuit, and therefore said end is connected through the variable resistance to the reference anode. The other end of the conductor of the governing drain circuit is connected to the variable resistance of the maintaining circuit and therefore said governing drain circuit also includes the ship's anode array, the electrolyte and the positive side of the impressed D.C. current.

As is known to those skilled in the art, an increased emission at the cathode (herein in ship's hull), due to environmental demands, imposes a higher current density demand to maintain the desired polarization level, and, to supply this higher current, results in an increased voltage across the ship's cell, and this of course provides an increase in the flow of electrons, i.e. there is an increase in suction effect on electrons when the current density is increased. (Let it be understood that when the term "suction" is employed, I am referring to the positive side of D.C. current, and when the term "pressure" is employed, I am referring to the negative side of the D.C. current.) Conversely, as the emission at the cathode decreases, the suction effect is decreased commensurately. I utilize this phenomenon to increase and decrease the flow of electrons through the monitoring system including the current responsive device in the reference circuit. The degree of energization of the current responsive device controls an impressed power supply means for impressing D.C. current on the cathode commensurate with the demand for such current for monitoring the cathode at the desired polarization level.

The vitalization or maintaining circuit is directly responsive to the variation in suction effect due to the variation in current density demand, and, the reference circuit, including the reference anode, and the governing drain circuit have modulating effects on the current responsive device, and, in cooperation with the vitalizing or maintaining circuit, so modulate the current flow through the current responsive device that the values of current impressed on the cathode are in exact relationship with the changes in emission at the cathode, resulting in maintaining constant polarization at the desired level.

The variable resistance in the maintaining circuit is utilized for varying as desired the value of suction effect on the electrons in said circuit for the advantages hereinafter set forth.

Furthermore, the invention contemplates a monitoring system which, in the event of failure, causes the impressed D.C. current to be rendered ineffective.

Further objects and advantages will be apparent from the following description, reference being had to the accompanying drawings wherein a preferred embodiment of the invention is illustrated.

In the drawings, the drawing is a circuit diagram showing one form of the invention.

The instant application is quite similar to my co-pending application filed on or about January 12, 1959, Serial Number 786,365, now Patent Number 2,963,413, issued December 6, 1960. The instant application distinguishes from that co-pending application, primarily, in that in that application the monitoring or drive anode is higher in the electrochemical series than the cathode, which is to be protected, while in the instant application, I have provided a monitoring system in which the monitoring or drive anode may be higher or lower in the electrochemical series than the cathode when the latter is elevated to its desired polarization level, and distinguishes from other monitoring systems using platinum anodes, in that no extraneous source of electrical energy need be impressed on the monitoring anode.

Heretofore, it was deemed necessary, in monitoring systems using a monitoring drive anode for protecting iron or steel against galvanic dissolution, to employ a higher potential monitoring drive anode, such as a magnesium alloy, having a potential level of 1490 millivolts with reference to a silver-silver chloride half-cell or reference electrode. Usually the maximum potential level desirable for protecting, for example, a ship's hull in sea water, is 1,000 millivolts with respect to such half-cell. Thus the potential difference between said reference anode and the ship's hull was of such high value that a relatively high resistance had to be included in the reference circuit to hold the potential level within desirable tolerances. For the reasons hereinafter more fully explained, the lower the resistance value that can be employed will result in a faster response to increasing or decreasing current demands. I have discovered that the potential level of a body, to be protected, can be maintained far more uniform, when subjected to wide current demands, by providing a monitoring reference anode having a potential level which is close to the level of the potential desired on the protected body. Such reference anode may be formed of zinc or zinc alloys, when protecting steel and iron in sea water. Such zinc or zinc alloys, which have potential levels ranging from 950 to 1,050 millivolts, with reference to said silver-silver chloride half-cell, are suitable for protecting steel or iron in sea water. However, in protecting steel or iron in fresh water, due to the high resistance of the fresh water, it is more desirable to use a magnesium reference anode, and the same is true with respect to protecting any steel or iron in any high resistance electrolyte such as high resistance earth.

The present invention provides for the use of such zinc, or zinc alloy or magnesium, or magnesium alloy as a reference or monitoring drive anode, although the potential level of such anode may be lower than that desired for the body being protected and although the circuit including such anode and body includes a current consuming device which must be satisfied to respond to a demand for impressed current on the body (the body being the cathode, herein shown as a ship's hull). The zinc alloy may be one of zinc and aluminum, or zinc and magnesium of the combination of the three metals, and the magnesium alloy may be one of magnesium and zinc or magnesium and aluminum or a combination of the three metals.

Referring more in detail to the drawing, my control system comprises, generally, impressed power supply means through a power rectifier 16, the output of which is controlled by a current responsive device in the form of a coil 21 of a reference circuit 20 in a monitoring system. The value of current passing through the coil 21 may be sufficient to more directly control the output of the power rectifier 16, if so desired, however in the preferred embodiment, I prefer to utilize a current responsive device herein shown as the coil 21 as part of a signal amplifier 10 which in turn is connected through a control reactor 12 and power reactor 14 to the power rectifier 16.

The impressed current supply means is connected between an anode array or assembly 26 (hereinafter referred to as the ship's anode) and the cathode 28 to be protected. The ship's anode 26 and the cathode 28 are shown submerged or immersed in the electrolyte 30 which, for example, can be sea water. As previously stated, for illustrative purposes, I have chosen the hull of a ship as the structure or object to be protected; and the ship's anode 26 can be of any suitable type such as that disclosed in my co-pending application entitled Electrolytic System, Serial Number 715,440, filed February 14, 1958, and preferably formed of a substantially inert anodic material.

The monitoring system includes a reference circuit 20 which in turn includes the reference or drive anode 24, a resistance 29, conductor 40, terminal 62 of amplifier 10, coil 21, terminal 64, conductor 60, a resistance 63, the structure shown as a ship's hull 28 and the electrolyte 30. The resistance 63 establishes a predetermined voltage drop between the hull and the reference anode. This resistance controls the flow of current toward and away from the reference anode 24 and cathode 28 but it cannot control the predetermined optimum difference between the reference anode and cathode under extreme wide range of demands, resulting in no exact control of the potential level of the cathode under extreme environmental conditions. I have discovered that the desired results can be obtained by the inclusion of modulating circuits, hereafter described.

The anode 24 is formed of material which is close in the electrochemical series to the potential level desired at the cathode 28, and, for example, if steel or iron is the cathode, and the electrolyte is sea water, then the anode 24 may be formed of zinc or a zinc alloy such as an alloy of magnesium and zinc or an alloy of zinc and aluminum, or an alloy of magnesium, zinc and aluminum, or aluminum, or alloys of aluminum such as an alloy of aluminum and zinc or aluminum and magnesium or a combination of the three. The monitoring system also includes what may be termed a "vitalizing circuit" or "maintaining circuit"; it includes a conductor 65 having one end thereof connected to the reference circuit between the resistance 63 and coil 21 and is therefore connected to the negative side of the impressed D.C. current source, the ship's hull 28 and the electrolyte 30 through the resistance 63, and is connected to the electrolyte through reference anode 24, variable resistance 29 and coil 21; the other end of conductor 65 is connected to one end of a variable resistance 33; this resistance 33 includes a movable resistance contact 53, which in turn is connected by conductor 57 to a fixed resistance 61, which resistance is connected by conductor 98 to the positive side of the impressed D.C. current at terminal 102, then via a full wave bridge (not shown) in rectifier 16, negative terminal 104, conductor 100, ship 28 to the electrolyte; also the resistance 61 is connected to the electrolyte via conductors 98 and 67 and anode array 26.

The monitoring system also includes a circuit (hereinafter at times referred to as a "governing drain circuit") including anode 24, resistance 29, the conductor 59, which is connected to that end of the variable resistance 33 opposite the end to which conductor 65 is connected; the drain circuit also includes movable resistance contact 53, conductor 57, resistance 61, conductor 98 connected to the positive terminal 102 of the power rectifier 16 then to the electrolyte through the full wave bridge of rectifier 16, conductor 100 and ship 28, and to the electrolyte through conductor 67 and the anode array 26.

In the operation of the system, reference to current flow is intended to mean the direction of electron flow, and reference to electron flow in the electrolyte is intended to mean the direction of electron migration within the ion exchange phenomena.

Obviously the emission of electrons from the cathode 28 to the electrolyte represents the principal electric load of the entire system and such emission is continuous although the cathode 28 is at its desired polarization level.

The automatic control system is devised to feed an amount of current to the cathode 28 to exactly balance the amount of this electron emission which takes place at the desired polarization level. The emission rate of this electron emission from the surface of the cathode 28 is governed by the environment and varies with velocity, temperature, ionic content of the sea water, conditions of paint coatings, etc.

Assuming that the values of the resistances 63, 21 and 61 are properly fixed and that the resistances 29 and 33 are properly adjusted, and assuming that the potential of cathode (ship's hull) 28 is at the desired level, for example, at 1,000 millivolts with reference to a silver-silver chloride electrode, then the electrons flowing through coil 21 are sufficient and sufficient only to monitor the impressed current system to cause the latter to impress sufficient and only sufficient current on the hull to compensate for the emission being discharged at the hull. However, as soon as the potential level of the hull starts to decrease, due to enrvironmental demands, i.e., as soon as there is an increased rate of emission at the cathode (hull), such increase in rate of emission imposes an increased voltage across the ship's cell (cathode 28 and anode array 26) which in turn results in providing more suction effect on electrons in the vitalizing or maintaining circuit. This increased suction effect causes increased electron flow through the reference coil 21 which in turn causes increased output of D.C. current by the rectifier 16 on the hull 28.

By way of exemplification of one system in which the voltage on the hull was maintained at 1,000 millivolts in sea water, the value of resistance 63 was 2,000 ohms so as to create a voltage drop between the hull, at 1,000 millivolts, to approximately 800 millivolts when subjected to the suction of the "maintaining circuit"; the resistance offered by coil 21 was 1,500 ohms, resistance 29 having a value of 0 to 20,000 ohms was set to have a value of 8,500 ohms; the capacity of the impressed current system was sufficient to supply at least 400 amperes at nine volts across the cell of current to the hull; the anode 24 had a value of 950 millivolts with reference to the silver-silver chloride electrode; the voltage drop across resistance 63 was approximately 200 millivolts because of the suction of the "maintaining circuit" and resistance 63 and the voltage drop across variable resistance 29 was approximately 130 millivolts also because of this suction of the "maintaining circuit" and the resistances resulting in a potential difference between 820 millivolts, at the end of resistance 29 and 800 millivolts at the end of resistance 63 namely 20 millivolts to deliver the required 20 microamperes through coil 21 for maximum demand condition. The above describes the response to maximum demands at full capacity, the minimum current demand at 1,000 millivolts will drop the voltage across the cell to approximately three and one-half volts; the potential differences together with the current flowing by reason of the "maintaining circuit," acting on coil 21, energized the same to control the impressed current system to deliver the required amperes to the hull; the resistance 33 is 0 megohm and the resistance of 61 is 40,000 ohms which resistance established a predetermined maximum current diversion through the maintaining circuit; at one desirable condition, as mentioned heretofore, the resistance 29 was adjusted to 8,500 ohms whereby it with coil 21 offered 10,000 ohms, and switch 53 was adjusted so that it offered 160,000 ohms resistance to the flow of electrons via conductor 65, and offered 840,000 ohms resistance to the flow of electrons via conductor 59; such resistance, with resistance 61, caused a total resistance via conductor 65 of 200,000 ohms, and a total resistance via conductor 59 of 880,000 ohms. Under such conditions, when the voltage across cell 26—28 was three and one-half volts, at a polarization level at the hull of 1,000 millivolts, relative to a silver-silver chloride electrode, and in sea water, the total current flow through conductor 65 via the combined 200,000 ohms resistance, offered by part of resistance 33 and all of 61, was fifteen micro-amperes, twelve and one-half micro-amperes being the result of current flowing from cathode 28 through resistance 63; at that time and with the conductor 59 disconnected, the current value in coil 21 was increased by the remainder, namely two and one-half micro-amperes. When the voltage across the cell 26—28 was nine volts, at a polarization level at the hull of 1,000 millivolts, relative to said reference electrode and in sea water, the total current flow through conductor 65 was sixty micro-amperes, fifty being via cathode 28 and resistance 63, and the amperes across coil 29 was increased by the remainder, namely by ten micro-amperes to a total of 20 micro-amperes, with conductor 59 relatively ineffective.

Other comparative values are set out below:

| Voltage Across Cell 26-28 Polarization Level at 1,000 mv. | Current Flow Through 65 With Total Resistance of 200,000 ohms in 33 and 61, μa. | Current From 28 Through Resistor 63 of 2,000 and 200,000 ohms of resistors 33 and 61, μa. | Current Increase Through Coil 21, total of resistors 29 and 21 being 10,000 ohms and 200,000 ohms of resistors 33 and 61, μa. |
|---|---|---|---|
| 3½ | 15 | 12.5 | 2.5 |
| 4 | 25 | 20.84 | 4.16 |
| 5 | 30 | 25 | 5 |
| 6 | 38 | 31.77 | 6.23 |
| 7 | 45 | 37.5 | 7.5 |
| 8 | 53 | 48.59 | 8.82 |
| 9 | 60 | 50 | 10 |

Obviously from the above, it is readily apparent that as the demand for polarization increases, which is reflected in increase of voltage drop across cell 26—28, the value of current flow in the reference coil is commensurately increased to thereby automatically cause the current output of the D.C. supply to increase commensurately.

It is to be understood that the value of resistances 29, 33 and 61 can be such that sufficient amperage can be developed in the vitalizing circuit whereby coil 21 can function to control the power rectifier 16 directly through the power reactor 14, however, I prefer to materially prolong the life of anode 24 and, to do so, I provide the amplifier 10 and the control reactor 12 in addition to the power reactor 14 and power rectifier 16. By employing these instruments and by suitably selecting the values of the resistances 29, 33 and 61, I can employ a relatively small anode which will last for a long period of time. Such anode would be approximately three inches in length and three-quarters inch in diameter.

This amplifier 10 is functionally responsive only to current in the forward direction. It is important to note, therefore, that the electrical potential of reference circuit 20 can be established at a level which, if it exists on the hull 28 also, will be sufficient to provide cathodic protection to the hull 28, and that the monitoring system will increase the output of the impressed current supply means at any time that this established level of potential falls.

With respect to the impressed current system, which is effective to raise the potential of the cathode 28 through the utilization of the reference current flowing through the monitoring means at amplifier 10, it will be seen that the amplifier 10 is supplied with power from a source of A.C. current 63. This A.C. input is controlled by impedance as a result of the A.C. windings on the reactor cores. The controlled A.C. is rectified and supplies the D.C. output. The D.C. current in coil 21 controls the degree of saturation of the cores, resulting in control of the D.C. output which is fed from a pair of D.C. output terminals 66 and 68 through a pair of conductors 70 and 72 to a pair of D.C. input terminals 74 and 76 of the amplifier or control reactor 12 in direct accordance with the degree of saturation of the coil 21. In tthe present embodiment, at full output the incoming signal will fully saturate at 20 micro-amperes, in which case the amplifier 10 of the present system puts out a signal in excess of 300 micro-amperes. It is important to note that signal amplifier 10 is of that type which saturates only in a forward direction, that is, from terminal 62 to terminal 64. Current flowing in the opposite direction will thus be ineffective to saturate the core of amplifier 10 and, accordingly, no signal input will be made to amplifier 10 by reason of any such reverse flow. This is important, as will be seen, because if a reverse flow of current through amplifier 10 would saturate the D.C. input core thereof, which as stated is not the case, the impressed current supply means would be actuated and tend to raise the potential of cathode 28 to a still greater level. The reverse flow would then increase, and the system would be uncontrolled. For this reason amplifier 10 is made to function or be actuated only by a flow of current in the forward direction from terminal 62 to terminal 64.

Control reactor 12, which is provided with power from a suitable 110 volt A.C. source 78, then amplified the input signal in excess of 300 milli-amperes which is fed through a pair of output terminals 80 and 82, and through a pair of conductors 84 and 86 and variable resistance 85 to the D.C. input terminals 88 and 90 of power reacor 14. Reactor 14, which is connected to a suitable 110 volt A.C. power source 92, further amplifies the signal, and this signal is fed to the A.C. input terminals 94 and 96 of power rectifier 16. The A.C. input is then rectified to a D.C. output which is connected to ship's anode 26 and cathode 28 by a pair of conductors 98 and 100 which in turn are connected, respectively, to the positive and negative output terminals 102 and 104 of rectifier 16. The variable 0 to 500 ohm resistance 85, will govern the maximum output wattage of the power reactor, which in turn limits the maximum wattage output as desired of the A.C. to D.C. power rectifier, thus eliminating the need for tap adjustments in the power rectifier circuit.

From the foregoing it will be seen that amplifier 10, reactor 12, reactor 14, and rectifier 16 are in effect various stages of an amplification system for accepting a small D.C. input signal and amplifying it to a rather large D.C. output signal. The D.C. output signal comprises the impressed current for raising the electrical potential of cathode 28 to provide the necessary cathodic protection therefor.

Thus, assuming as before that cathode 28 is below the desired potential the small input signal from reference circuit 20 of the monitoring means will be amplified through the amplification system just described, and the D.C. output of rectifier 16 will impress an electron flow through conductor 100 to cathode 28, and thence through the electrolytic or water path to anode array 26 to complete the impressed electrochemical circuit.

It will be understood that as the voltage across the cell 26—28 decreases, due to decrease in demand for polarization current at the cathode 28, the suction rate in the maintaining circuit will be decreased commensurately, resulting in commensurate lessening of electron flow through coil 21 and a consequent commensurate lessening of input of impressed current on the cathode whereby the polarization level is maintained constant.

Although it was assumed that the potential of cathode 28 dropped an appreciable extent to initiate the above operation, it will be apparent that no appreciable drop will normally occur because the system tends to maintain a continuous balance between the impressed current system and the reference circuit 20. That is, the slightest fal in the potential of the cathode 28 will be immediately corrected by the actuation of the impressed current system through the varying of current value in the coil 21 of the reference circuit 20. Likewise, as soon as the impressed current means has brought the potential of cathode 28 to its proper level, the impressed current system is rendered ineffective.

Thus it is apparent that I have provided a monitoring system which functions to cause current to be impressed on the cathode at such rate as to maintain the desired polarization level at all times regardless of the rate of emission of electrons at the cathode.

While I have selected 1,000 millivolts as the potential level desired, such was used only for convenience of illustration; it is well known that it is desirable to maintain the hulls of ships somewhere between 850 and 1,000 millivolts, depending on the size of the ship, it being well known that a large ship need not and should not have as high potential as a smaller ship.

The reference potential in reference circuit 20 is, as previously stated, that potential at which satisfactory cathodic protection is provided to cathode 28 when cathode 28 is also near that potential. The potential of reference circuit 20 may be established independently by utilizing the well known reference electrode or half-cell (not shown). Such a reference electrode can be of any suitable type such as the silver-silver chloride reference electrode which has a potential in the electrolyte 30 which differs from the potential of the cathode 28 when it is submerged in the electrolyte. The reference electrode can be utilized in combination with any suitable microvoltmeter or sensitive recording instrument to determine the achieved polarization level of the structure.

The level of the current flow necessary to cathodically protect the cathode 28 may be determined by adjusting the variable resistance 29 in combination with resistance 33 until the independently connected reference electrode indicates that the potential of cathode 28 is satisfactory to provide cathodic protection. Once this resistance is determined, the polarization reference electrode and meter could be disconnected, but for practical purposes it is usually left installed to afford a constant reading or recording of the potential of cathode 28.

The advantage of reducing the resistance in the reference circuit to a minimum is readily apparent from the chart herebelow, following Ohm's law wherein it is shown that to attain a differential of ten micro-amperes, using 40,000 ohms resistance, namely from 250 micro-amperes to 240 micro-amperes, requires a potential drop of forty millivolts, namely from 1,000 to 960 millivolts, whereas when only 20,000 ohms resistance is employed, the differential of ten micro-amperes is attained by the difference between 500 micro-amperes and 490 micro-amperes by a drop of only twenty millivolts, namely from 1,000 to 980 millivolts, and whereas when only 10,000 ohms resistance is employed, the differential of ten micro-amperes is attained by the difference between 1,000 micro-amperes and 990 micro-amperes by a drop of only ten millivolts, namely from 1,000 to 990 millivolts.

*Current flow in ratio to circuit resistance*

| Potential Difference in—Millivolts | 40,000 ohms Resistance, μa. | 20,000 ohms Resistance, μa. | 10,000 ohms Resistance, μa. |
| --- | --- | --- | --- |
| 1,000 | 250 | 500 | 1,000 |
| 990 | 247.5 | 495 | 990 |
| 980 | 245.0 | 490 | 980 |
| 970 | 242.05 | 485 | 970 |
| 960 | 240.0 | 480 | 960 |

Thus it is obvious that the lower the resistance value that can be employed in adjustable resistance 29 of the reference circuit, the higher the current flow will result at any given change in potential difference between the cathode 28 and anode 24, resulting in more spontaneous response to current demands on the system through coil 21.

The inclusion of the governing drain circuit, namely the reference anode 24, resistance 29, conductor 59, part of resistance 33, contact 53, conductor 57, resistance 61, conductors 98 and 27, anode array 26 and the electrolyte, has several advantages. By such inclusion both anodes 24 and 26 and therefore all anodes and the cathode are electrically tied to one another by a solid state conductor of metal, as distinguished from being connected only through the electrolyte. Thus, it will be observed that the reference anode 24 delivers electrons through the metallic circuit to the lower negative electrode (anode array 26) as well as to the electrolyte. Thus a complete metal loop is provided which is not disturbed functionally by an extraneous source of electrical energy such as another electrolytic cell in the same electrolyte as for example the hull of an adjacent ship and its anode array which may have a higher potential level than that of the instant ship 28 being controlled by the present invention.

Another advantage of this positively closed loop electrical circuit lies in the possibility of conservation of electrical energy and the elimination of detrimental surface reactions during that period of raising, materially, the potential level of the cathode from, for example, its normal static potential to that necessary to prevent dissolution in the electrolyte. It will be understood that time is a factor in increasing the polarization of steel; for example, on large ships, two days may be necessary to bring the hull from its static to its desired potential level. Too, ample power must be available at all times, at the rectifier 16, to raise the potential of the hull 28 from its static level to that level desired. During the period that the hull is being raised from its normal static low polarization level to that level desired, there normally would be a tendency to impress current on the hull at a rate higher than true polarization can take effect, resulting in material loss of electrical energy and possible damage to surface coatings, however, by the employment of the closed loop circuit, the value of the impressed current can be regulated automatically by the balancing effect of modulating the electron flow, part through the reference circuit 20 and part through the conductor 59, all as previously described. Wherever practical, the raising of the potential level can be hastened by increasing the resistance in variable resistance 33 to thereby lessen the flow of electrons in the governing drain circuit, resulting in making more electrons available in energizing coil 21 of the reference circuit 20. Too, inasmuch as parts of resistance 33 comprise parts of the maintaining circuit and the governing drain circuit, the lessening of flow of electrons in the governing drain circuit, decreases the resistance offered by resistance 33, in the maintaining circuit, and in so doing, the electron suction effect in said maintaining circuit is increased making more electrons available for energizing coil 21 of the reference circuit 20. After optimum polarization is achieved it is now desirable to reduce the resistance 33 between conductor 57 and 65 to a level to promote added electron flow through coil 21 as current demands increase thus maintaining optimum polarization.

The chart herein depicts the value of electron flow through reference coil 21 by reason of the inclusion of the maintaining or vitalizing circuit sans the governing drain circuit. When said governing drain circuit is included, the values of electron flows through coil 21 are reduced approximately ten percentum when the resistance in said circuit approximates 840,000 ohms, as examples at three and one-half volts across the ship's cell 26—28, the value is reduced from 2.5 $\mu a$ to approximately 2.25 $\mu a$, the remainder of .25 $\mu a$ passing via the governing drain circuit, and, at ten volts at the ship's cell, the value is reduced to approximately 9.00 $\mu a$, the remainder of 1.00 $\mu a$ passing via the governing drain circuit. Obviously the variable resistances 29 and 33 can be adjusted to satisfy coil 21 when the governing drain circuit is or is not used. However, it will be understood that by reason of the advantages of the drain circuit, it is used.

Should the monitoring electrode be withdrawn from the electrolyte and unintentionally not restored to the electrolyte, the galvanic relationships between the anode 24 and the cathode 28 and between anode 24 and anode array 26 are interrupted and consequently coil 21 will be rendered ineffective. When coil 21 is ineffective, the reactor 16 will be rendered ineffective. Thus should the reference circuit be interrupted for any reason whatsoever, the system "fails safe" in that no extraneous current is impressed on the cathode.

By way of example, the values of the signal amplifier 10, control rectifier 12, power reactor 14 and power rectifier 16 may be, as is specifically set forth in my aforementioned co-pending application, any my co-pending application Serial Number 739,104, filed June 2, 1958 (now Patent 2,982,714). It has been found that a system having the above components has ample capacity to provide complete cathodic protection for a ship 300 feet in length with a steel hull, and having approximately 12,000 to 13,000 square feet of wetted surface.

From the foregoing it will be seen that I have provided a control system requiring no moving parts, that is, no mechanical relays, contact points, servo mechanism, motorized variacs or other moving parts which are apt to be rendered ineffective or give false results in case of severe shock such as that caused by gunfire, and which require extensive and continuous maintenance. Inasmuch as I have provided a monitoring system in which zinc or a zinc alloy, aluminum or an aluminum alloy, or magnesium or a magnesium alloy can be used as the anode in that system, I have provided a monitoring system in which predetermined desirable variable results can be achieved and in which precise control is obtained and which has substantially instantaneous response and which closely follows the demand of the system. These alloys, having a level in the electrochemical series compatible to the environment and close to the optimum polarization level desirable for iron or steel, to prevent galvanic dissolution, when used as a monitoring anode, provides one in which its monitoring effect is highly sensitive to minor changes in the monitoring system, whereby such precise control is in effect constantly or in effect to provide a delayed response if desired. Such performance coupled with the lack of maintenance is particularly important in systems of the type which are often installed in large ships which may not return to their home ports for long periods of times. It is well understood by those in the art that a breakdown in the system, while the ship is out of port, could permit severe damage to occur to the hull of the ship before the system could be placed in operation.

It is also apparent, from the foregoing, that I have provided a system in which the polarization level, once established, can be maintained substantially constant. Also great saving of electrical energy is effected by the present system during that period of time when a ship is brought from its normal static polarization level to a polarization level in which dissolution of the steel is prevented and at minimum current densities at the interface of the cathode to achieve this optimum polarization level.

Also it is apparent that I have provided a system which fails safe in the event of failure for any reason whatsoever of the reference circuit. In failing safe, there will be no flow of current from the reactor 16 to the ship's hull. In this manner, paint stripping and other damage to the structure, due to over-polarization, is prevented.

It is also apparent that in addition to being useful for cathodic protection of the hulls of ships, barges or other floating vessels, or submarines, my system can be used for cathodically protecting other structures such as underwater foundations, pipe lines, storage reservoirs and the like.

The full and dotted arrows, indicating electron flows, are indicating the direction of electron flows in the metallic conductors and the direction of the electron migration in the ionic exchange phenomena of electrolyte or sea water 30.

The arrows, shown in full lines, illustrate normal electron flow during periods of current flow to cause an increase or where desired polarization is maintained on the ship under the various conditions creating the demands. The arrows, shown in dotted lines, illustrate electron flows to block further polarization rise on the ship, i.e., in the event of a surge current being impressed on the hull, the electrons will flow as indicated by the dotted arrow, setting up a counter E.M.F. in coil 21 to thereby lessen its amperage value to cause the impressed current on the hull to be reduced.

While the form of embodiment herein shown and described constitutes a preferred form, it is to be understood that other forms may be adopted falling within the scope of the claims that follow.

I claim:

1. In combination, a cathode, an anode, said cathode and anode being immersed in an electrolyte; a source of direct current having the negative side thereof connected to the cathode and having the positive side thereof connected to the anode to raise the potential of the cathode; a monitoring system comprising a monitoring anode in the electrolyte, a conductor constantly connecting the monitoring anode and the cathode, means including a current responsive device in the conductor responsive to the flow of current between the monitoring anode and the cathode for causing varying of the value of current flow from said source of current to the cathode, a resistance in the conductor interposed between said current responsive device and the cathode, a second conductor having one end connected with the first mentioned conductor between the current responsive device and the said resistance and having the other end connected with the first mentioned anode, and a resistance in the second mentioned conductor.

2. A system as defined in claim 1, characterized in that the last mentioned resistance is of variable type.

3. A system as defined in claim 1, characterized in that the first mentioned conductor includes a second resistance interposed between the monitoring anode and the current responsive device.

4. A system as defined in claim 1, characterized in that the first mentioned conductor includes a resistance of the variable type between the monitoring anode and the current responsive device.

5. A system as defined in claim 1, characterized in that the first mentioned conductor includes a resistance of the variable type between the monitoring anode and the current responsive device, and that the resistance in the second mentioned conductor is of the variable type.

6. A system as defined in claim 1, characterized in that the potential level of the monitoring anode is lower than that of the cathode when the latter is maintained at the desired polarization level.

7. A system as defined in claim 1, characterized in that the material forming the monitoring anode is zinc.

8. A system as defined in claim 1, characterized in that the material forming the monitoring anode is an alloy of zinc and aluminum.

9. A system as defined in claim 1, characterized in that the material forming the monitoring anode is an alloy of zinc and magnesium.

10. A system as defined in claim 1, characterized in that the material forming the monitoring anode is an alloy of zinc and aluminum and magnesium.

11. A system as defined in claim 1, characterized in that the material forming the monitoring anode is aluminum.

12. A system as defined in claim 1, characterized in that the material forming the monitoring anode is an alloy of aluminum and magnesium.

13. A system as defined in claim 1, characterized in that the material forming the monitoring anode is magnesium.

14. A system as defined in claim 1, characterized to include a third conductor having one end connected with the first conductor intermediate the monitoring anode and the current responsive device and having the other end thereof connected with the first mentioned anode, and a resistance in the third mentioned conductor.

15. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and a resistance in the third mentioned conductor.

16. A system as defined in claim 1, characterized to include a third conductor having one end connected with the first conductor intermediate the monitoring anode and the current responsive device and having the other end thereof connected with the first mentioned anode, and a variable type resistance in the third mentioned conductor.

17. A system as defined in claim 1, characterized in that the first mentioned conductor includes a second resistance interposed between the monitoring anode and the current responsive device, and further characterized to include a third conductor having one end connected with the first conductor intermediate the second mentioned resistance and current responsive device and having the other end thereof connected with the first mentioned anode, and a variable type resistance in the third mentioned conductor.

18. A system as defined in claim 1, characterized to include a third conductor having one end connected with the first conductor intermediate the monitoring anode and the current responsive device and having the other end thereof connected with the first mentioned anode, and a resistance in the third mentioned conductor, and further characterized in that the potential level of the monitoring anode is lower than that of the cathode when the latter is maintained at the desired polarization level.

19. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and a resistance in the third mentioned conductor, and further characterized in that the potential level of the monitoring anode is lower than that of the cathode when the latter is maintained at the desired polarization level.

20. A system as defined in claim 1, characterized to include a third conductor having one end connected with the first conductor intermediate the monitoring anode and the current responsive device and having the other end thereof connected with the first mentioned anode, and a resistance in the third mentioned conductor, and further characterized in that the monitoring anode is formed of zinc.

21. A system as defined in claim 1, characterized to include a third conductor having one end connected with the first conductor intermediate the monitoring anode and the current responsive device and having the other end thereof connected with the first mentioned anode, and a resistance in the third mentioned conductor, and further characterized in that the monitoring anode is formed of aluminum.

22. A system as defined in claim 1, characterized to include a third conductor having one end connected with the first conductor intermediate the monitoring anode and the current responsive device and having the other end thereof connected with the first mentioned anode, and a resistance in the third mentioned conductor, and further characterized in that the monitoring anode is formed of magnesium.

23. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and a resistance in the third mentioned conductor, and further characterized in that the monitoring anode is formed of zinc.

24. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and a resistance in the third mentioned conductor, and further characterized in that the monitoring anode is formed of aluminum.

25. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and a resistance in the third mentioned conductor, and further characterized in that the monitoring anode is formed of magnesium.

26. A system as defined in claim 1, characterized in that the first mentioned conductor includes a second resistance interposed between the monitoring anode and the current responsive device, and further characterized to include a third conductor having one end connected with the first conductor intermediate the second mentioned resistance and the current responsive device and having the other end thereof connected with the first mentioned anode, and further characterized in that the potential level of the monitoring anode is lower than that of the cathode when the latter is maintained at the desired polarization level.

27. In combination, a cathode, an anode, said cathode and anode being immersed in an electrolyte; a source of direct current having the negative side thereof connected to the cathode and having the positive side thereof connected to the anode to raise the potential of the cathode; a monitoring system comprising a monitoring anode in the electrolyte, a conductor constantly connecting the monitoring anode and the cathode, means including a current responsive device in the conductor responsive to the flow of current between the monitoring anode and the cathode for causing varying of the value of current flow from said source of current to the cathode, a resistance in the conductor interposed between said current responsive device and the cathode, a variable resistance having two ends and a movable contact contacting the same intermediate the said ends for varying the value of the last mentioned resistance, a second conductor having one end connected with the first mentioned conductor between the current responsive device and the said last mentioned resistance and having the other end connected with an end of the variable resistance, a third conductor having one end thereof connected with the first mentioned conductor intermediate the monitoring anode and the current responsive device and having the other end connected with the opposite end of the variable resistance, and a conductor connecting the movable contact with the first mentioned anode.

28. A system as defined in claim 27, characterized in that the first mentioned conductor includes a second resistance between the monitoring anode and the current responsive device, and further characterized in that the third mentioned conductor is connected with the first mentioned conductor intermediate the second mentioned resistance and the current responsive device.

29. In a system employing a cathode, an anode, and in which the cathode and anode are immersed in an electrolyte, and in which the polarization level is raised by impressing a D.C. current on the cathode, and in which a control circuit is utilized including a current responsive device to vary the value of D.C. current being impressed on the cathode and which control circuit includes a monitoring anode, the cathode and the electrolyte, those steps in the method of modulating the value of current flowing through the current responsive device which comprise: resisting the flow of electrons between the cathode and current responsive device, and withdrawing electrons from the control circuit at a point intermediate the cathode and the current responsive device.

30. A method as defined in claim 29 characterized to include the step of also withdrawing electrons from the control circuit at a point intermediate the monitoring anode and the current responsive device.

31. A method as defined in claim 29 characterized in that the control circuit includes a resistance between the monitoring anode and the current responsive device and to include the step in the method of also withdrawing electrons from the control circuit at a point intermediate said resistance and the current responsive device.

References Cited in the file of this patent

UNITED STATES PATENTS

| | | |
|---|---|---|
| 476,914 | Bernard | June 14, 1892 |
| 2,221,997 | Polin | Nov. 19, 1940 |
| 2,752,308 | Andrus | June 26, 1956 |
| 2,759,887 | Miles | Aug. 21, 1956 |

FOREIGN PATENTS

| | | |
|---|---|---|
| 669,675 | Great Britain | Apr. 9, 1952 |